March 21, 1944.   J. C. KOLDERMAN ET AL   2,344,779
MACHINE FOR MAKING HOLLOW BODIES
Filed Aug. 27, 1941   4 Sheets-Sheet 1

Inventors
Johannes C. Kolderman
William K. Speckin
By John S. Braddock
Attorney

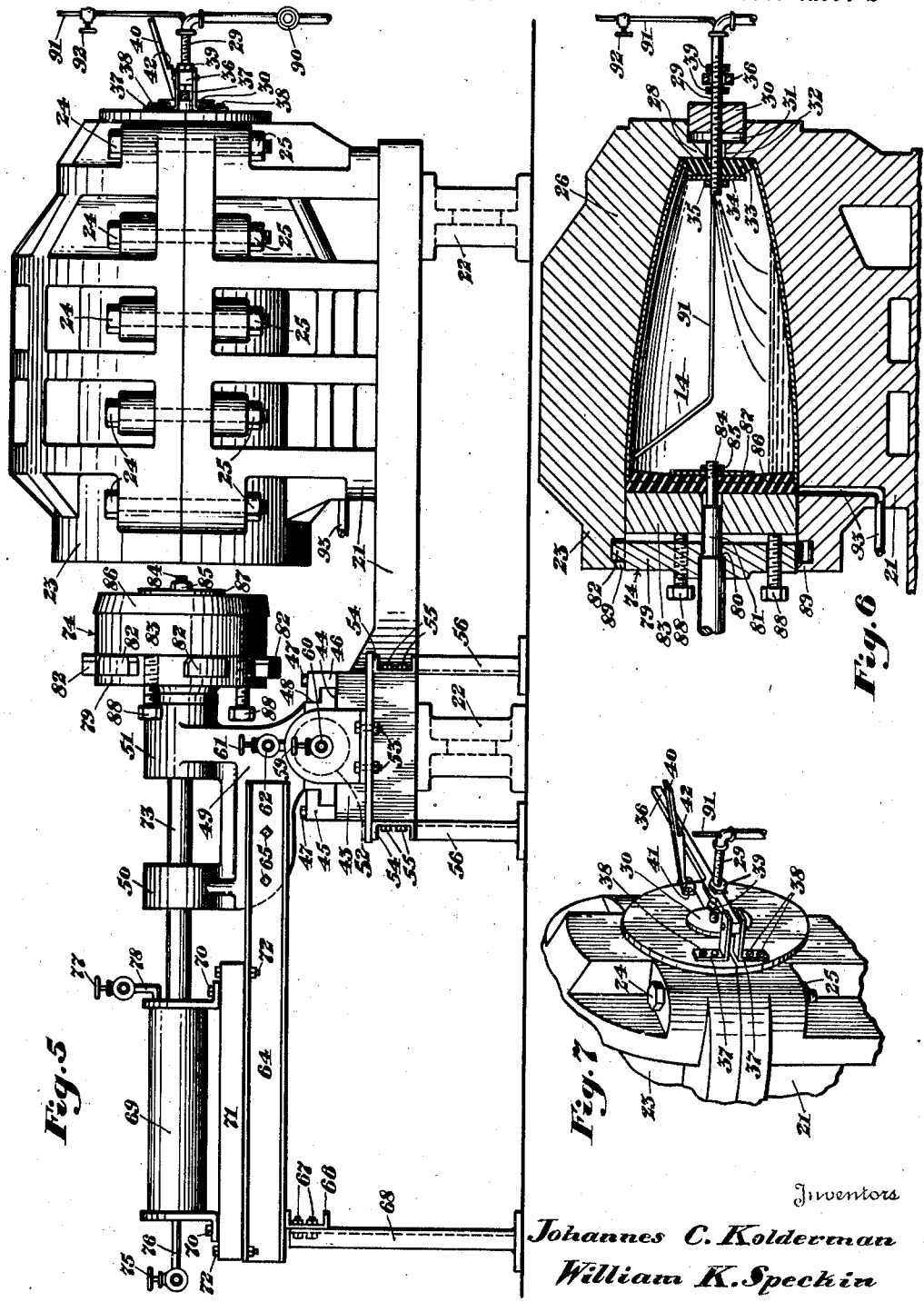

March 21, 1944. J. C. KOLDERMAN ET AL 2,344,779
MACHINE FOR MAKING HOLLOW BODIES
Filed Aug. 27, 1941 4 Sheets-Sheet 4

Inventors
Johannes C. Kolderman
William K. Speckin
By John S. Braddock
Attorney

Patented Mar. 21, 1944

2,344,779

UNITED STATES PATENT OFFICE 2,344,779

MACHINE FOR MAKING HOLLOW BODIES

Johannes C. Kolderman and William K. Speckin, Grand Rapids, Mich., assignors to Hayes Manufacturing Corporation, Grand Rapids, Mich.

Application August 27, 1941, Serial No. 408,530

5 Claims. (Cl. 113—44)

The present invention relates to machines for making hollow bodies and more particularly to such machines for making hollow sheet metal bodies which comprise certain portions of the external casings for torpedoes or the like.

The primary objects of the invention are to provide a machine for making elongated open-ended hollow sheet metal bodies strictly conforming to predetermined form or specifications; to provide such a machine which reduces to a minimum the amount of time and expense required in producing such bodies; to provide such a machine for making hollow sheet metal bodies which utilizes the economical operations of stamping each body in complementary halves, welding said halves together and thereafter impressing each body into its predetermined form or specifications; and to provide a machine for performing the said impressing operation which is efficient in operation, convenient in use, and relatively economical to manufacture.

Illustrative embodiments of the invention are shown in the accompanying drawings, wherein:

Figure 5 is a side elevational view of the machine shown in Figure 4;

Figure 6 is a fragmentary central vertical sectional view thereof taken on line 6—6 of Figure 4;

Figure 7 is a fragmentary perspective view of a portion of the rear of the machine;

Figure 1:
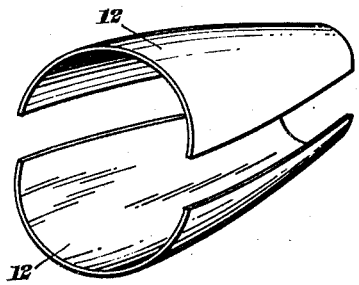
Figure 1 is a perspective view of two complementary halves of a portion of a torpedo casing, the halves having been identically stamped of sheet metal.
Figure 2:
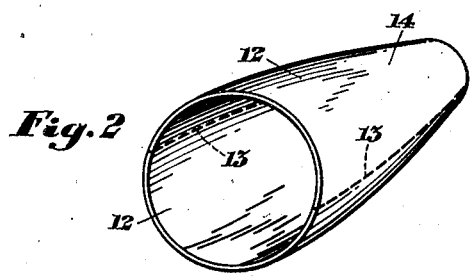
Figure 2 is a perspective view similar to Figure 1 and showing the two complementary halves of sheet metal welded together to form an elongated open-ended hollow body.
Figure 3:
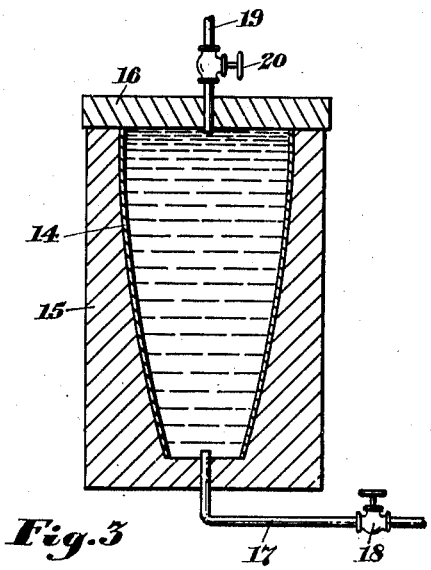
Figure 3 is a central vertical sectional view through the hollow body shown in Figure 2 in association with means for diagrammatically illustrating an operation in the performance of the method of the present invention.
Figure 4:
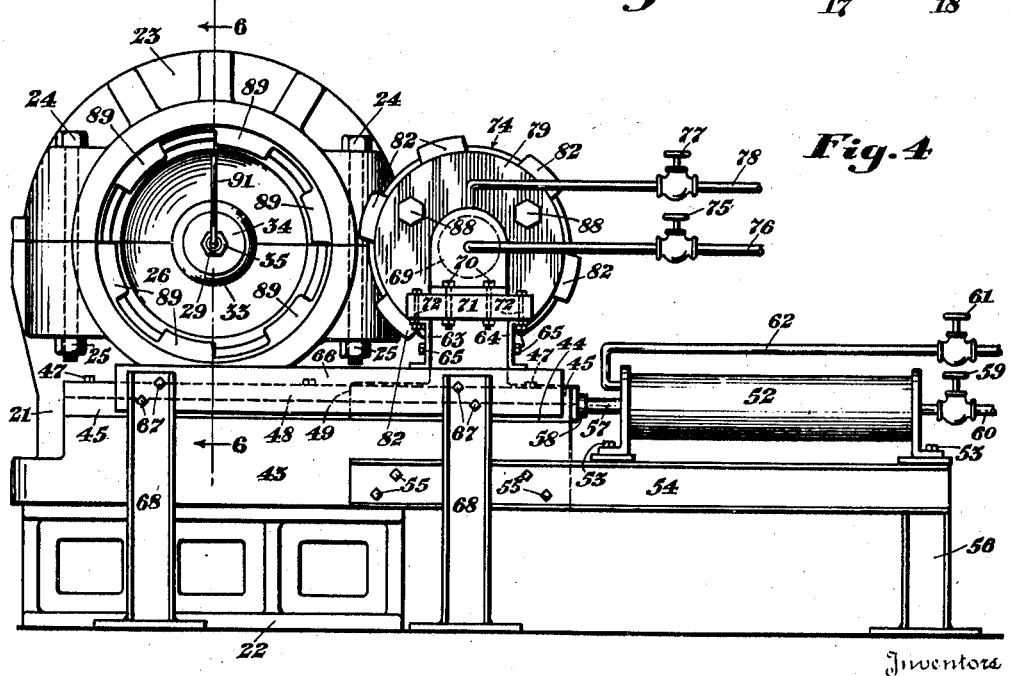
Figure 4 is a front elevational view of an actual machine for performing said operation.
Figure 8:
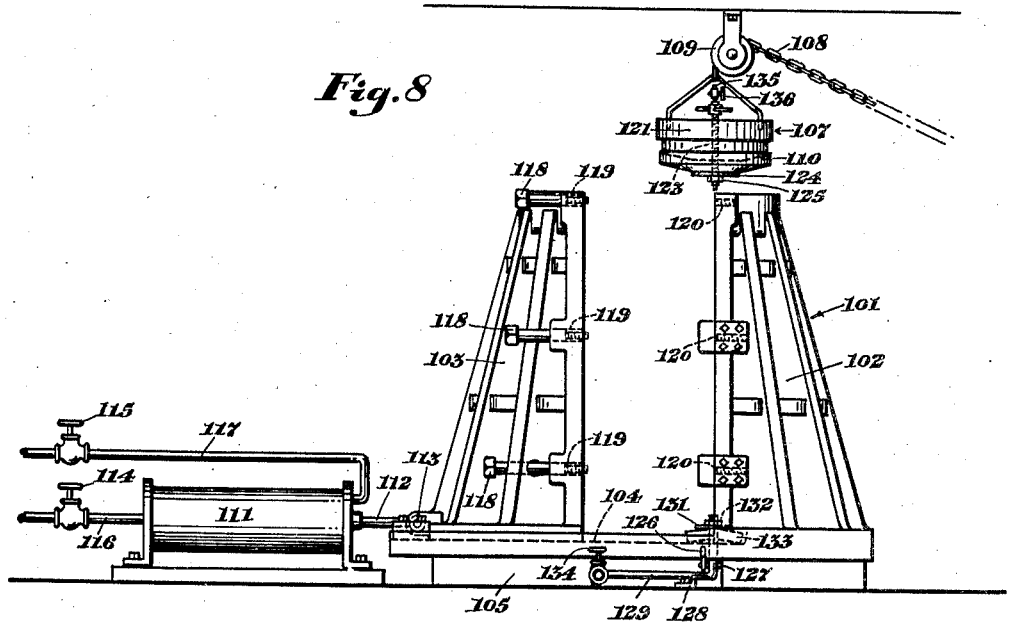
Figure 8 is a side elevational view of a modified form of the machine shown in Figures 4 to 7 inclusive.
Figure 9:
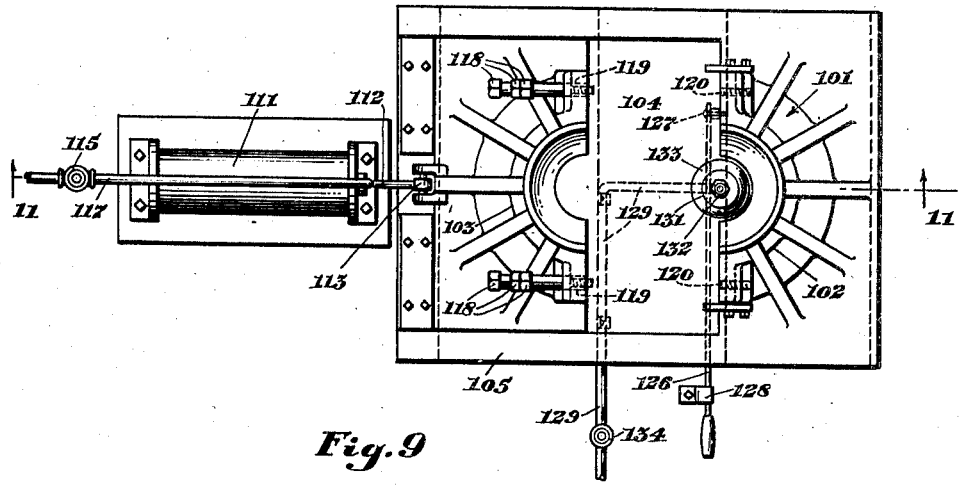
Figure 9 is a top plan view of certain parts of the modified form of machine shown in Figure 8.
Figure 10:
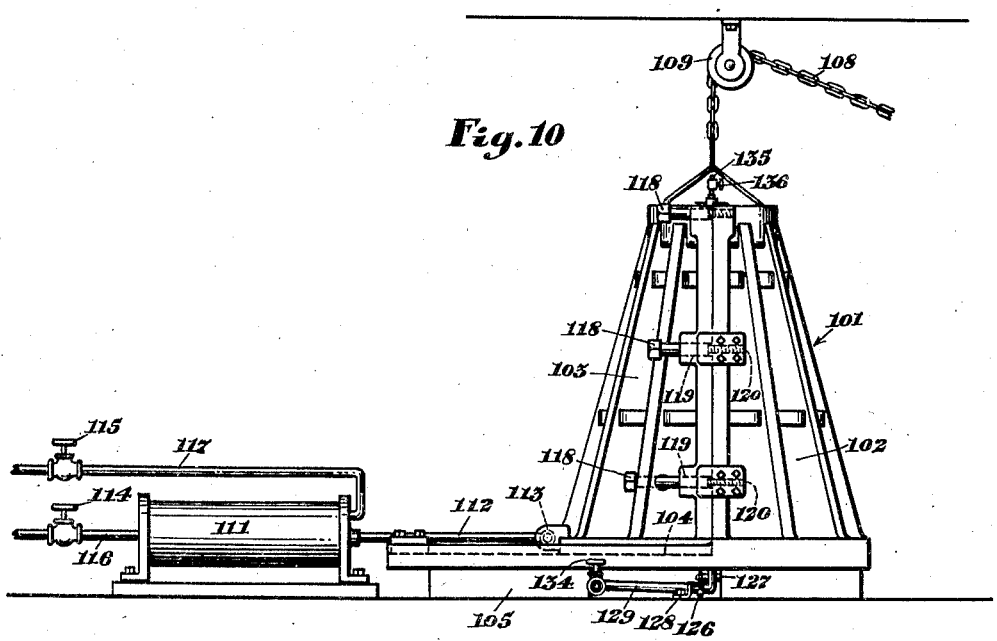
Figure 10 is a view similar to Figure 8 but showing certain parts of this machine in different positions.
Figure 11:
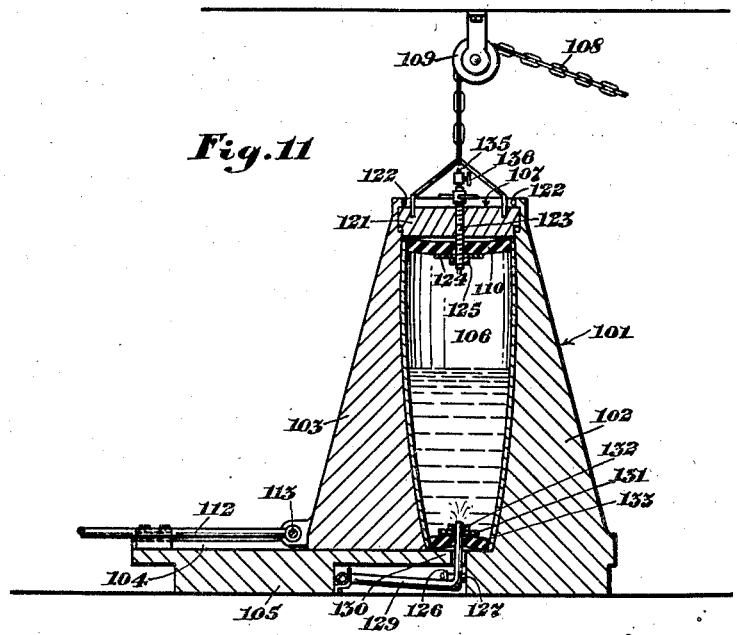
Figure 11 is a fragmentary central vertical sectional view thereof taken on line 11—11 of Figure 9, the parts of the machine being shown in the same positions as those shown in Figure 10.

Referring now in detail to these drawings wherein the same parts are designated by the same numerals in the several views, and referring first particularly to Figures 1, 2, and 3, these figures illustrate the method of the invention as particularly employed in the manufacture of a portion of the hollow casing of a torpedo such as is fired from submarines or other naval vessels, and which is formed of two identical complementary stampings 12, 12 which are welded together along opposite longitudinal seams 13 to form a hollow sheet metal body 14 of substantially truncated-paraboloidal form, that form being the predetermined specification in this instance. The sheet metal here used is a relatively light gauge metal, and it will be readily understood that during the welding operations the metal almost invariably becomes somewhat distorted from its normal predetermined form. In such a circumstance, one method of restoring the hollow body to its true specified form would be to impress the body between external and internal dies. It has been discovered, however, that in the performance of that method considerable wear is incurred by the dies and particularly the internal die, so that the dies themselves are no longer absolutely true. The present method of restoring the hollow body to its true specified form eliminates this disadvantage.

As diagrammatically illustrated in Figure 3, the method of this invention comprises inserting the distorted hollow body 14 into an external die 15, sealing the body 14 within the die as represented by the cover plate 16, introducing water under pressure into the interior of the body through a fluid supply conduit 17 having a valve 18 therein, exhausting the air from the hollow body through an air exhaust conduit 19 having a valve 20 therein and closing said valve, and thereafter bringing the fluid pressure within the body up to a sufficient degree to distend the hollow body into conformity with the external die 15.

Figures 4 to 7 inclusive illustrate a machine for performing this method of restoring the distorted hollow sheet metal bodies to their normal predetermined form. The machine generally comprises a lower casting 21 supported at the front and rear thereof as by means of cast metal supporting frames 22, and an upper casting 23 rigidly secured to the lower casting as by means of bolts 24 passing through vertically aligned apertures through the upper and lower castings and provided with nuts 25 threaded on the lower ends thereof. These upper and lower castings 23 and 21 respectively form complementary halves of an external die 26 whose hollow interior conforms to the normal predetermined exterior shape of the hollow sheet metal bodies, one of which bodies is seen within the die in Figure 6 and is designated 14.

The front end of the die 26 is open for the reception of a hollow body 14 to be impressed, and the rear end of said die has an end wall 28 against which the smaller open end of the hollow body 14 abuts. A fluid supply pipe or conduit 29 threaded in an annular member 30 longitudinally movable in an axial slide bearing 31 in the end wall 28 of the die 26, extends through an aperture 32 in said end wall 28 into the interior of the hollow body 14. The inner end of said fluid supply pipe 29 passes through a flexible rubber sealing element 33 and a disc 34, and has a nut 35 threaded on the inner end thereof. As best seen in Figure 7, a lever 36 pivotally mounted between brackets 37 secured as by means of screws 38 to the rear face of the die 26, is secured to the external portion of the fluid supply pipe 29 as by means of nuts 39 threaded on the supply pipe on opposite sides of the lever 36. It will be seen that when the free end of the lever 36 is moved rearwardly, the entire fluid supply pipe 29 is likewise moved rearwardly, and the disc 34 displaces the rubber element 33 to seal the smaller open end of the hollow body 27. These parts are then held in their rearward sealing positions by means of a bar 40 pivotally mounted at 41 on the rear face of the die 26 and having an abutment 42 thereon which releasably engages the lever 36 in its rearward position.

The forward portion 43 of the lower casting 21 is enlarged and elongated from side to side and has a smooth upper surface 44. A pair of oppositely disposed guide rails 45, 46 are secured as by means of screws 47 to the forward and rearward portions of the smooth upper surface of the forward portion 43 of said casting 21 thus forming a channel 48 in which is slidably disposed the lower end portion of a carriage 49 whose upper end is so cast as to form a pair of forwardly-rearwardly aligned bearings 50, 51. The carriage 49 is moved from its starting position shown in Figure 4 to a position in which the bearings 50, 51 thereon are in axial alignment with the die 26, and is returned to its starting position, by means of a pneumatic cylinder 52 mounted as by means of bolts 53 on a pair of horizontal channel bars 54 whose inner ends are secured as by means of screws 55 to the casting 21 and whose outer ends are supported by a pair of upright channel bars 56. The piston rod 57 of the pneumatic cylinder 52 is connected at 58 to the carriage 49, and it will readily be seen that the carriage may thus be moved to the left (as viewed in Figure 4) by opening air valve 59 to admit compressed air through the pipe 60 to the right end of the cylinder 52, and that the carriage 49 may be reversely moved to the right (as viewed in Figure 4) by opening valve 61 to admit compressed air through pipe 62 to the left end of the pneumatic cylinder 52.

A second pair of horizontal channel bars 63, 64 are secured at their rearward ends to the carriage 49 by means of screws 65 and are slidably supported at their forward ends by a horizontal channel bar 66 secured as by means of bolts 67 to the upper ends of a pair of upright channel bars 68. A second pneumatic cylinder 69 is mounted as by means of bolts 70 on a block 71 which straddles the channel bars 63, 64 and is secured thereto as by means of bolts 72. The piston rod 73 of this second cylinder 69 passes through the forwardly-rearwardly aligned bearings 50, 51 on the carriage 49, and a head generally designated 74 may be moved rearwardly (or to the right as viewed in Figure 5) toward the die 26 by opening a valve 75 to admit compressed air through pipe 76 to the forward or left end of the cylinder 69, and may be moved reversely away from the die 26 by opening valve 77 to admit compressed air through pipe 78 to the rearward or right end of this cylinder (as viewed in Figure 5).

The head 74 comprises an annular metal base 79 revolubly mounted on the rearward end portion of the piston rod 73 and secured against forward sliding movement relative to the piston rod 73 by means of a shoulder 80 (see Figure 6) which embraces the reduced portion 81 of said piston rod. This base 79 is provided with a plurality of radially projecting lugs 82 here shown as six in number and equidistantly spaced about the periphery of the base 79. An annular disc 83 is revolubly and longitudinally slidably mounted on the reduced portion 81 of the piston rod 73. The extreme end portion 84 of said piston rod 73 is further reduced and threaded to receive a nut 85, and a flexible rubber sealing element 86 and rigid metal disc 87 are interposed between the annular disc 83 and the nut 85. A plurality of screws 88, here shown as three in number, are threaded through the base 79 and abut the annular disc 83.

In operation, the distorted hollow body 14 is inserted into the die 26 and sealed at the rearward or closed end of the die as previously described. Air valve 60 is opened to move the carriage 49 and the head 74 opposite the open or forward end of the die 26, and air valve 75 is then opened to move the head 74 into said open end of the die. The head 74 is then rotated so that the lugs 82 on the base 79 of the head engage behind similar inwardly projecting lugs or keepers 89 in the open end or mouth of the die 26. The screws 88 are then advanced, which moves the annular disc 83 farther into the die, and the rubber element 86 is displaced between the discs 83 and 87 thus sealing the other end of the hollow body 14 and the open end of the die. A valve 90 (see Figure 5) in the fluid supply pipe 29 is then opened and water is introduced into the interior of the hollow body 14 which, while being thus filled with water, is exhausted of air through an air exhaust conduit or bleed line 91 extending from the upper interior of the hollow body 14, through the fluid supply pipe 29 and thence to the atmosphere. When the hollow body is filled with water, valve 92 in the air exhaust conduit exteriorly of the die is closed, whereupon fluid pressure is built up within the hollow body 14 and that body is distended into its true specified form conforming to the external die 26. Air valve 77 is then opened just sufficiently to permit the head 74 to move slightly forwardly allowing the water in the die to drain off through a drain conduit 93 extending through the lower wall of the die, after which the head 74 is returned to its position shown in Figure 5, and the carriage 49 is returned to its starting position shown in Figure 4.

In the modified form of machine shown in Figures 8 to 11 inclusive, the external die 101 comprises upright complementary halves, one half 102 of which is stationary, and the other half 103 of which is horizontally movable in a channel 104 in the base 105 of the machine. The distorted hollow sheet metal body 106 is placed in the stationary half 102 of the die, and the head 107 which is suspended on a chain 108 passing over a pulley 109 is lowered into position and the rubber sealing element 110 of the head 107 enters the upper end of the hollow body 106. The movable half 103 of the die 101 is then moved into position against its complementary stationary half 102 by means of a pneumatic cylinder 111 whose piston rod 112 is connected at 113 to the movable half 103 of the die, and whose valves 114 and 115 may alternately be operated to admit air through the air pipes 116 or 117 respectively and thus move the half 103 of the die to the right or to the left respectively as viewed in the drawings.

When the movable half 103 of the external die has been moved into position abutting the stationary half 102, bolts 118 which are slidably mounted in bearings 119 in the movable half 103 of the die are securely turned into threaded sockets 120 in the stationary half 102 of the die. The base 121 of the head 107 is then raised to abut against a shoulder 122 formed in the two halves of the die, whereupon a hollow screw 123 extending through said base 121 and provided on its lower end with a metal disc 124 and nut 125, is turned so that the flexible rubber sealing element 110 interposed between the base 121 and disc 124 of the head is displaced and thus seals the upper end of the hollow body 106.

A lever 126 pivotally mounted at 127 on the base 105 is then moved downwardly and releasably engaged beneath a keeper 128, which movement of the lever 126 draws downwardly the end of a fluid supply conduit 129 whose inner end portion extends through the lower wall 130 of the die and is provided with a metal disc 131 and with a threaded nut 132 the downward movement of which displaces a flexible rubber sealing element 133 and seals the lower end of the hollow body 106.

Water is then admitted to the interior of the hollow body 106 through the fluid supply conduit 129 by opening a valve 134 in said conduit, while at the same time air is exhausted from the hollow body 106 through an air exhaust conduit 135 which extends from the upper interior of the hollow body 106, through the hollow screw 123 and a valve 136 to the atmosphere. When the hollow body 106 is filled with water, the air exhaust valve 136 is closed and fluid pressure is built up within the hollow body 106 to distend said body into conformity with the external die. The water may then be drained off through the fluid supply conduit 129, the movable half 103 of the die moved to the left, and the restored hollow body removed from the machine.

While but several specific embodiments of the invention have been herein shown and described, it will be understood that numerous details thereof may be altered or omitted without departing from the spirit of the invention as the same is defined by the following claims.

We claim:

1. In a machine for impressing hollow bodies into a predetermined form, an external die of said predetermined form open at one end and adapted to receive one of said hollow bodies into nesting relationship with the die, a carriage movable transversely of the longitudinal axis of the die toward and from the open end of the die, a head mounted on the carriage and carried by the same to and from the open end of the die and provided with means for closing and sealing said open end, and means for introducing fluid pressure into the interior of said hollow body and for exhausting fluid pressure therefrom.

2. In a machine for impressing hollow bodies into a predetermined form, an external die of said predetermined form open at one end and adapted to receive one of said hollow bodies into nesting relationship with the die, a carriage movable transversely of the longitudinal axis of the die, a head mounted on the carriage and carried by the same to and from a position adjacent the open end of the die, means mounted on the carriage for moving the head to and from the open end of the die, said head being provided with means for closing and sealing the open end of the die, and means for introducing fluid pressure into said hollow body and for exhausting fluid pressure therefrom.

3. In a machine for impressing hollow bodies into a predetermined form, an external die of said predetermined form open at one end and adapted to receive one of said hollow bodies into nesting relationship with the die, a carriage movable transversely of the longitudinal axis of the die, a head mounted on the carriage and carried by the same to and from a position adjacent the open end of the die, means mounted on the carriage for moving the head to and from the open end of the die, said head being provided with means for closing and sealing the open end of the die, cooperating means on the head and on the die for interlocking the head in its die closing position, and means for introducing fluid pressure into said hollow body and for exhausting fluid pressure therefrom.

4. In a machine for impressing hollow bodies into a predetermined form, an external die of said predetermined form open at one end and adapted to receive one of said hollow bodies into nesting relationship with the die, a carriage slidably guided and movable transversely of the longitudinal axis of the die, a cylinder mounted on the carriage and disposed longitudinally with respect to the die and having a piston rod movable toward and from the die, a head carried by the piston rod to and from the open end of the die and provided with means for closing and sealing said open end, means for actuating the carriage in its slidable movements, and means for introducing fluid pressure into said hollow body and for exhausting fluid pressure therefrom.

5. In a machine for impressing hollow bodies into a predetermined form, an external die of said predetermined form open at one end and adapted to receive one of said hollow bodies into nesting relationship with the die, a carriage slidably guided and movable transversely of the longitudinal axis of the die, a cylinder mounted on the carriage and disposed longitudinally with respect to the die and having a piston rod movable toward and from the die, a head carried by the piston rod to and from the open end of the die and provided with means for closing and sealing said open end, a cylinder having a piston rod connected with the carriage for actuating the same in its sliding movements, and means for introducing fluid pressure into said hollow body and for exhausting fluid pressure therefrom.

JOHANNES C. KOLDERMAN.
WILLIAM K. SPECKIN.